H. E. GILBERT.
REGULATING VALVE DEVICE FOR GAS SUPPLY TO OVENS, &c.
APPLICATION FILED SEPT. 10, 1913.
1,177,857.
Patented Apr. 4, 1916.
2 SHEETS—SHEET 1.
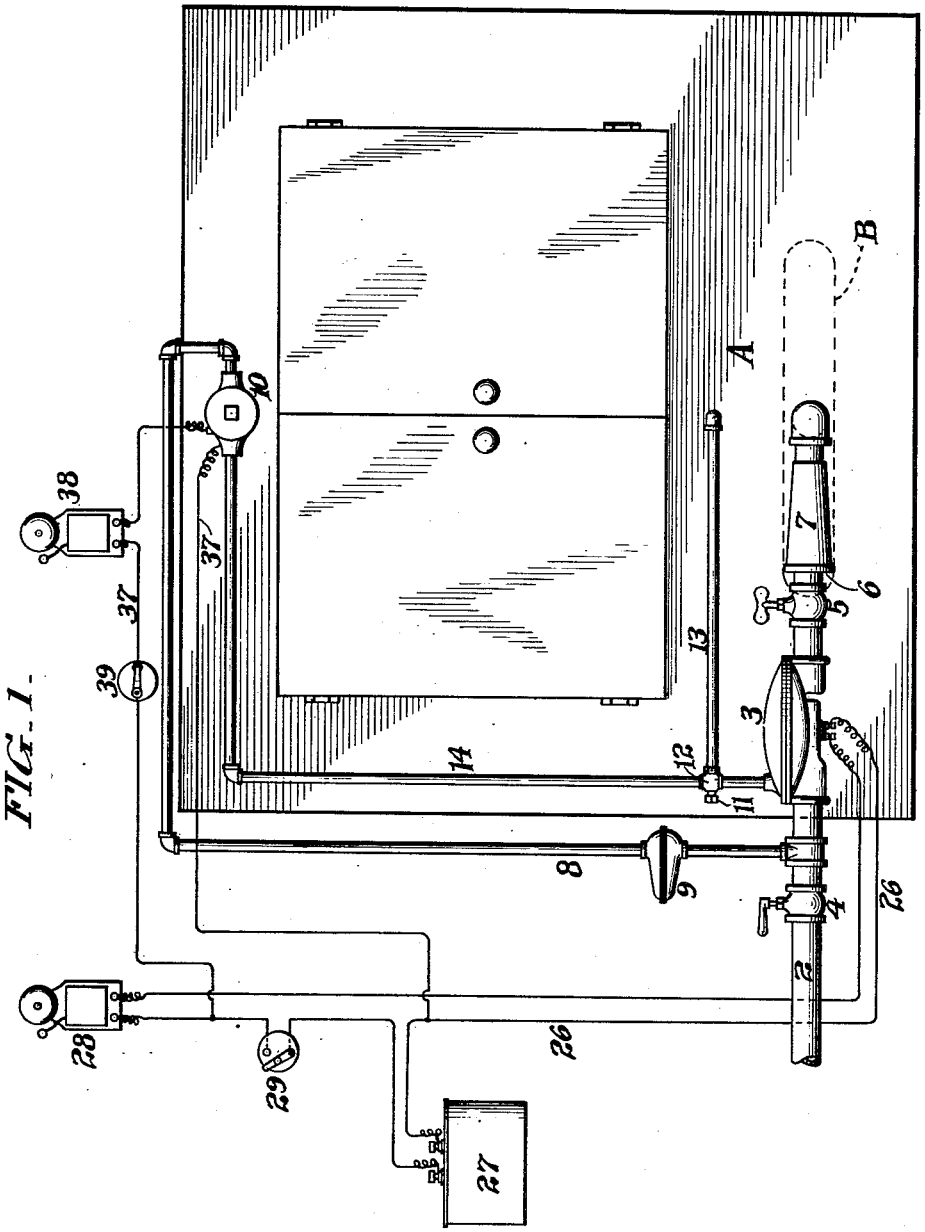
FIG. 1.
WITNESSES
Daniel Webster, Jr.
E. W. Smith.
INVENTOR
Harry E. Gilbert.
BY
ATTORNEY H. E. GILBERT.
REGULATING VALVE DEVICE FOR GAS SUPPLY TO OVENS, &c.
APPLICATION FILED SEPT. 10, 1913.
1,177,857.
Patented Apr. 4, 1916.
2 SHEETS—SHEET 2.
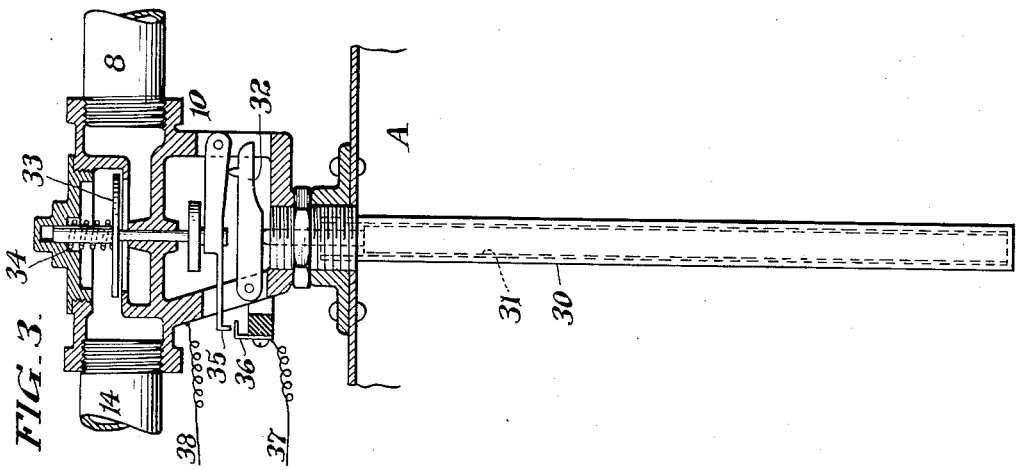
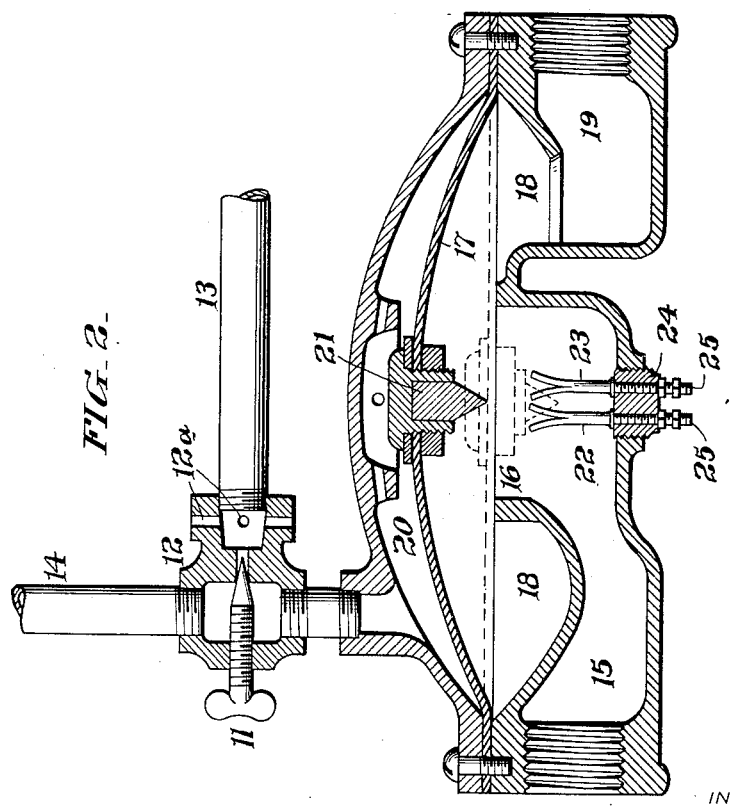
WITNESSES
Daniel Webster, Jr.
E. W. Smith
INVENTOR
Harry E. Gilbert.
BY
ATTORNEY

UNITED STATES PATENT OFFICE.

HARRY E. GILBERT, OF CONSHOHOCKEN, PENNSYLVANIA.

REGULATING-VALVE DEVICE FOR GAS-SUPPLY TO OVENS, &c.

1,177,857.  Specification of Letters Patent.  Patented Apr. 4, 1916.

Application filed September 10, 1913. Serial No. 789,024.

*To all whom it may concern:*

Be it known that I, HARRY E. GILBERT, citizen of the United States, and resident of Conshohocken, county of Montgomery, and State of Pennsylvania, have invented an Improvement in Regulating-Valve Devices for Gas-Supply to Ovens, &c., of which the following is a specification.

The object of my invention is to provide a suitable method and means for automatically regulating the temperature of gas heated ovens and similarly heated chambers, wherein the temperature is required to be kept within predetermined range, such as is preferably required for drying, annealing, tempering and other commercial purposes, and whereby the attendant may be automatically informed of the arrival of the desired temperature condition of the oven.

By my improvements, the oven may be gradually raised to the desired temperature for annealing or other purpose, and when this is reached, a thermostatic device automatically puts into operation pressure control means which quickly shuts off the supply of gas to the oven and at the same time causes an alarm or signal to notify the attendant that the required temperature condition has been reached.

As a further refinement of my invention, I provide signaling means arranged to be operated under the control of the thermostatic device to indicate to the attendant the time when the automatic quick operating gas supply valve is opened to again raise the temperature of the oven, said signal taking place at the time of the minimum temperature allowed in the oven or furnace during normal operation of the apparatus. By this means, the attendant may know when the oven is in condition for introduction of the articles to be heated; and likewise, when the other automatic signaling device is put into action by the closing of the quick acting gas valve, the attendant may know when the oven is fully heated and the contents should be withdrawn.

More specifically described, my improved apparatus consists of a gas supply pipe to the oven with provision for mixing the necessary air to insure proper combustion, and in which pipe is arranged a quickly acting diaphragm valve for shutting off or admitting gas to the burner of the oven in accordance with the requirements, the operation of said diaphragm valve being due to the pressure of the gas and controlled by a bypass bleed pipe opening from the gas supply pipe before it reaches the diaphragm valve, and connecting with said valve in such manner as to act upon the diaphragm to close the valve, said bleed pipe being controlled by a thermostatically operated valve which opens when the temperature of the oven reaches a maximum temperature, said action operating to insure gas pressure both above and below the diaphragm of the valve to cause the positive closing of the valve and shutting off of the gas supply, except as it may be admitted through the bleed pipe directly into the oven, as more fully described hereinafter.

My invention further consists in the valve diaphragm valve combined with an automatic signaling device which gives a suitable signal or sight indication to the attendant when the valve is closed and supply of gas is shut off, namely at a time when the maximum temperature is reached; and further in providing, if desired, an automatic signal device or sight indication to be put into action by the thermostatically operated valve of the bleeder pipe to indicate to the attendant the condition of minimum temperature allowed and the simultaneous opening of the gas supply diaphragm valve. In the operation of these signaling devices, dependence is put upon the thermostatically operated valve for determining the time of the signals, one being made when the thermostatically operated valve is opened and the other when it is closed but while there are two signals preferably given, corresponding to high and normal low temperatures of the oven, I may dispense with the signal indicative of low temperature, retaining the other or high temperature signal or alarm, if so desired.

My invention also comprehends details of construction which, together with the features above set forth, will be better understood by reference to the drawings, in which:—

Figure 1 is an elevation of an apparatus of the character described and embodying my invention; Fig. 2 is a sectional elevation of the automatic diaphragm gas supply valve and connections, embodying my invention; and Fig. 3 is a plan view, with part in section, of a thermostatically operating valve especially employed in the bleeder pipe and also employing signaling devices forming a part of my improved apparatus.

As stated in the foregoing portion of this specification, my invention is applicable to various specific uses, and I therefore only describe the improved method and apparatus here set out and shown by way of example, reserving the right of its application to various commercial uses wherever a maximum temperature is not to be exceeded under normal operation, and also where a proper signaling of the attendant is to be provided when said temperature condition is reached.

A is an oven of any suitable construction and adapted for annealing, tempering, drying or any other commercial purpose, or it may be designated as a furnace, according to the special use thereof.

2 is a gas supply pipe by which gas is delivered to a mixer 7, into which air is sucked at 6 and the mixture supplied to the oven or furnace where it may be burned from any suitable burner B as is customary. This gas supply pipe 2 contains a main hand operated shut-off valve 4, an automatic control valve 3, and a hand adjustable regulating valve 5 close to the mixer 7 and between it and the automatic valve 3.

A bleeder pipe 8 leads from the gas supply pipe 2 from a point between the valves 3 and 4 and leads to the inlet of a thermostatically operated valve 10, whose expansible part 30—31 (Fig. 3) is arranged within the oven or furnace or at any suitable point where temperature control may be desired. The outlet of this valve 10 connects with pipe 14 whose other end opens into the upper chamber 20 of the automatic valve 3.

At 13 is an escape pipe, discharging into the oven A near the burner thereof; and said pipe opens from a bleeder valve 12, having a needle valve piece 11 for regulating the extent of the bleed or passage of gas permitted. This valve also has air holes 12ª for permitting inflow of air to mix with the gas whereby the mixture forms a highly combustible gas which may be burned in the oven. These various pipes 8, 14 and 13 together constitute a bleed pipe system.

Referring to Fig. 2, the automatic valve 3 comprises an upper chamber 20 and a lower chamber 18 separated by a diaphragm 17 held at its perimeter to the casing of the valve body. The lower chamber opens into the outlet port 19. The inlet port 15 extends to the middle of the lower chamber and opens upward, providing an annular valve seat 16. When the diaphragm 17 is forced upward by the gas, the gas passes from inlet port 15 into chamber 18 and thence into outlet port 19 on its way to the oven to be heated. When the diaphragm 17 is down, as shown in dotted lines, it rests upon the annular valve seat 16 and shuts off the supply of gas to the burner of the oven. The diaphragm 17 may be of rubber or leather, or other flexible material and at its central part may have a metal contact head 21 suitably clamped in position and preferably made conical or bluntly pointed so as to act as a bridging contact for the electric contacts 22 and 23 held in a plug 24 of insulating material and arranged in the central part of the bottom of the casing. The spring contacts 22 and 23 are preferably threaded rods extending through the insulating plug 24, and may be split on their inner ends to form two pairs of flexible contact fingers between which and in contact with the pointed bridging contact 21 passes. The outer ends of the screw threaded rods are provided with clamping nuts and binding nuts 25 of usual construction. Any other form of circuit closing contacts may be employed in lieu of those shown, if so preferred. 28 is a signal bell, arranged in an electric circuit 26, containing a battery 27, and a switch 29 and having its terminals connected with the respective contacts 22 and 23. When the diaphragm 17 is down, to shut off the supply of gas to the oven, the circuit is completed by the contact 21 and the bell 28 signals the fact that the gas supply is shut off. As this condition only takes place when the oven is at its maximum temperature, the attendant is thus notified of the fact and may act according to requirements.

The operation of the diaphragm 17 is made to take place as follows: While the oven is heating up, the valve 3 is as shown in Fig. 2, and the thermostatically operated valve 10 is closed, and because of the pressure of the gas on the under side of the diaphragm, it is held up so as to permit the passage of gas and keep the circuit 26 open. If now, the maximum temperature is reached, the heat of the oven actuates the valve 10 thermostatically to open it and thereby the bleed line system also. The gas now passes through pipe 8, valve 10, pipe 14 and acts upon the upper part of the diaphragm 17 to force it down upon the seat 16 and thereby close off the further supply of gas to the burner B. A small quantity of gas passes through the bleed valve 12 and mixing with air, passes through pipe 13 into the oven and ignites from the flame of the main burner B before it is shut off. This small flame continues to burn as a pilot light to ignite the main burner when the gas is turned on again after the temperature of the oven falls sufficiently to cause the thermostatic valve 10 to close and change the pressure from above the diaphragm 17 to below the same. When the valve 10 closes, the gas from chamber 20 is forced out through the bleed valve 12 and pipe 13 to maintain the pilot flame, while the main gas passes through valve 3 and direct to the main burner B, where it ignites from the pilot light. In due time, the diaphragm 17 will be fully raised and then the pilot or bleed light will go out for want of a gas supply. These operations will be repeated according to the temperatures of the oven. An ordinary pilot light may be permitted to burn continuously for igniting the main burner also.

I have referred to the thermostatically operated valve 10, but so far have not described its detailed construction. This valve may be of any suitable make or structure, but preferably so as to act to fully shut off the gas when closed. In Fig. 3, I have shown a general form of such a valve as may be used with my apparatus, the same being by way of example only; as I do not restrict myself to any details in such a valve. In this case, a valve piece 33 closes a thoroughfare between the inlet and outlet ports of the valve 10. This valve piece is closed upon its seat by a spring 34 and is moved away from its seat to open the thoroughfare by the lever mechanism 32 and the expansible members 30 and 31, which are of such metals or materials that heating expands the member 31 more rapidly than the member 30. The more expansible member may be of copper if so desired. Various forms of thermostatic valves may be used and I therefore reserve the right to use any form of such device as may be found most satisfactory. To provide signal means, that the attendant may know when the oven has cooled to such extent that it is required to begin again to be heated, I arrange a fixed insulated contact 36 on the casing of the thermostatic valve 10 and a spring contact finger 35 on one of the moving levers thereof (Fig. 3); and to the contact 36, I connect a circuit 37 leading to circuit 26 on one side of the battery 27. I also place in said circuit 37 an electric signal 38. From the circuits 26, one the other side of the battery 27, I arrange a circuit 38 which connects with the body of the valve 10 or connecting pipes. When the valve piece 33 seats to close the valve, the contact finger 35 touches contact 36 and causes the signal 38 to sound. A suitable switch 39 may be arranged in circuit 37 to temporarily open it after the signal is given. By this provision of signals for both the closing of the valve 3 and valve 10, the attendant will receive ample notice of the presence of both the maximum and minimum temperatures permissible and may therefore carry on the operations of the oven intelligently and with accuracy.

While I have shown electric bells 28 and 38 as the signal means, it is not necessary that they shall be sound indicators, as any other suitable indicators may be employed. Furthermore, while I have shown separate indicators for high and low temperatures, it will be manifest that the same signal device may be used for both high and low temperatures, these changes being merely matters of detail which will be understood by those familiar with electric signal and indicator devices. By having separate bells, the difference in sound will make it apparent at once whether high or low temperature has been reached, and hence I prefer to use separate signals. I have also shown in pipe 8 a screen or filter 9 to prevent the passage of matter which might clog the needle or bleed valve 11—12, though I do not require such device where the gas is clean. It is, however, preferable that such screening means be employed.

The specific arrangement of the pipes and construction of the valves and signal devices as to details, may all be modified within the limits of the claims and therefore, while I have shown certain details by way of example, I do not restrict myself thereto.

Having now described my invention, what I claim as new and desire to secure by Letters Patent, is:—

1. In a valve for controlling the flow of gas, the combination of a casing provided with an inlet port and an outlet port and a thoroughfare between them provided with a valve seat, a flexible diaphragm of non-metallic material greatly in excess of the diameter of the valve seat secured to the casing and having its central portion adapted to directly seat upon the valve seat to close the thoroughfare, an insulating closure arranged below the valve seat and in the thoroughfare, a pair of electric terminals carried by said closure and projecting upward into the thoroughfare to a position below the valve seat and extending through the insulating closure to a point outside of the valve casing, and a metal contact fixed to the diaphragm at its center and constituting a weight in alinement with the valve seat for pulling the flexible diaphragm down into seating relation with the valve seat under the action of gravity and for simultaneous making of contact between the two electric terminals for normally closing the electric circuit when the diaphragm is seated upon the valve seat.

2. In an automatic valve for controlling the flow of gas, a casing having inlet and outlet ports communicating through a thoroughfare having a valve seat, combined with a flexible insulating diaphragm secured within the casing and adapted to seat itself upon the valve seat to close communication between the inlet and outlet ports, an insulating bushing extending through the casing below the valve seat and in the thoroughfare, a pair of electric terminals extending through the bushing and having their upper ends terminating in flexible parts, and a circuit closing device consisting of a weighted metallic part secured to the diaphragm immediately above the valve seat and the terminals and having its lower part tapered for making contact between the flexible ends of the two terminals when the diaphragm is in its closed position, said weighted part being smaller than the port through the valve seat and insulated from it.

3. In a controlling valve for controlling the flow of gas, a casing having a chamber provided with an inlet port, an outlet port and a thoroughfare between them having an upwardly directed annular valve seat of a diameter greatly less than the total diameter of the casing chamber, in combination with a flexible diaphragm of soft non-metallic material of a diameter greatly in excess of the diameter of the valve seat and secured at its perimeter to the casing providing a horizontal diaphragm to divide the chamber of the casing into two completely isolated compartments and having its central portion adapted to seat upon the valve seat to close the thoroughfare between the inlet and outlet ports, a heavy metallic body fixed to the center of the flexible diaphragm and of a diameter less than the diameter of the valve seat and constituting a weight which under the action of gravity pulls the flexible diaphragm down into seating relation over the edge of the valve seat and also acts as a circuit closer, an insulating closure arranged below the valve seat and fastened to the casing, and a pair of yielding electric terminals carried by said closure and projecting upwardly into the thoroughfare to a position whereby the metal body acting as a circuit closer may come into contact therewith to close the circuit through the terminals.

4. In a controlling valve for controlling the flow of gas, a casing having a chamber provided with an inlet port, an outlet port and a thoroughfare between them having an upwardly directed annular valve seat of a diameter greatly less than the total diameter of the casing chamber and said casing also having an inlet at its upper part, in combination with a flexible diaphragm of soft non-metallic material of a diameter greatly in excess of the diameter of the valve seat and secured at its perimeter to the casing providing a horizontal diaphragm to completely divide the chamber of the casing into two non-communicating compartments and having its central portion adapted to seat upon the valve seat to close the thoroughfare between the inlet and outlet ports one of the compartments in communication with the thoroughfare and valve seat and the other in communication with the inlet in the upper part of the casing, a heavy metallic body fixed to the center of the flexible diaphragm and of a diameter less than the diameter of the valve seat and constituting a weight which under the action of gravity pulls the flexible diaphragm down into seating relation over the edge of the valve seat and also acts as a circuit closer said weight having a pointed lower portion, an insulating closure arranged below the valve seat and fastened to the casing, and a pair of electric terminals carried by said closure and consisting of upwardly directed rods each having a plurality of flexible upper contact ends projecting upwardly to a position whereby the pointed lower portion of the metal body acting as a circuit closer may come into contact therewith to close the circuit through the terminals.

In testimony of which invention, I hereunto set my hand.

HARRY E. GILBERT.

Witnesses:
HERBERT F. LEWIS,
MORRIS L. KOLB.